(12) United States Patent
Nakamura et al.

(10) Patent No.: US 11,118,980 B2
(45) Date of Patent: Sep. 14, 2021

(54) INFRARED SENSOR

(71) Applicant: MITSUBISHI MATERIALS CORPORATION, Tokyo (JP)

(72) Inventors: Kenji Nakamura, Naka (JP); Kazuyoshi Tari, Saitama (JP); Shingo Hirano, Naka (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 534 days.

(21) Appl. No.: 16/070,917

(22) PCT Filed: Jan. 27, 2017

(86) PCT No.: PCT/JP2017/002960
§ 371 (c)(1),
(2) Date: Jul. 18, 2018

(87) PCT Pub. No.: WO2017/131166
PCT Pub. Date: Aug. 3, 2017

(65) Prior Publication Data
US 2021/0072086 A1     Mar. 11, 2021

(30) Foreign Application Priority Data

Jan. 29, 2016    (JP) .............................. JP2016-016512

(51) Int. Cl.
*G01J 5/20*          (2006.01)
(52) U.S. Cl.
CPC ....................................... *G01J 5/20* (2013.01)
(58) Field of Classification Search
CPC ...................................... G01K 7/22; G01J 5/20
See application file for complete search history.

(56) References Cited

U.S. PATENT DOCUMENTS

| 5,962,854 A * | 10/1999 | Endo ......................... G01J 5/02 |
|  |  | 250/338.1 |
| 9,182,286 B2 * | 11/2015 | Nakamura ................ G01J 5/08 |

(Continued)

FOREIGN PATENT DOCUMENTS

| CN |    103403507 A | 11/2013 |
| JP | 2011-232294 A | 11/2011 |

(Continued)

OTHER PUBLICATIONS

Machine translation of JP 2013-160635 (Year: 2013).*

(Continued)

*Primary Examiner* — Yara B Green
(74) *Attorney, Agent, or Firm* — Locke Lord LLP

(57) ABSTRACT

To provide an infrared sensor that allows heat to be efficiently transferred from an insulating film to a heat sensitive element and has a good responsivity. The infrared sensor according to the present invention includes an insulating film 2; a pair of first adhesive electrodes 3A that is patterned on either surface of the insulating film; a pair of first terminal electrodes 4A that is patterned on either surface of the insulating film; a first heat sensitive element 5A that is provided on either surface of the insulating film and is connected to the pair of first adhesive electrodes; a pair of first pattern wiring parts 6A that is patterned on either surface of the insulating film with one end thereof being connected to the pair of first adhesive electrodes and the other end thereof being connected to the pair of first terminal electrodes; and a heat transfer film 7.

5 Claims, 3 Drawing Sheets

(56) References Cited

U.S. PATENT DOCUMENTS

| | | |
|---|---|---|
| 9,279,729 B2 | 3/2016 | Nakamura et al. |
| 2014/0374596 A1 | 12/2014 | Tari et al. |

FOREIGN PATENT DOCUMENTS

| | | | | |
|---|---|---|---|---|
| JP | 2012-42384 A | | 3/2012 | |
| JP | 2012-098088 A | | 5/2012 | |
| JP | 2013-50365 A | | 3/2013 | |
| JP | 2013-160635 | * | 6/2013 | ................ G01J 5/02 |
| JP | 2013-156235 A | | 8/2013 | |
| JP | 2013-160635 A | | 8/2013 | |
| JP | 2015-055524 A | | 3/2015 | |

OTHER PUBLICATIONS

Office Action dated Nov. 4, 2020, issued for the Chinese Patent Application No. 201780004034.X and English translation thereof.
Office Action dated Nov. 27, 2019, issued for Chinese Patent Application No. 201780004034.X and English translation thereof.
International Search Report dated Apr. 18, 2017, issued for PCT/JP2017/002960 and English translation thereof.

\* cited by examiner

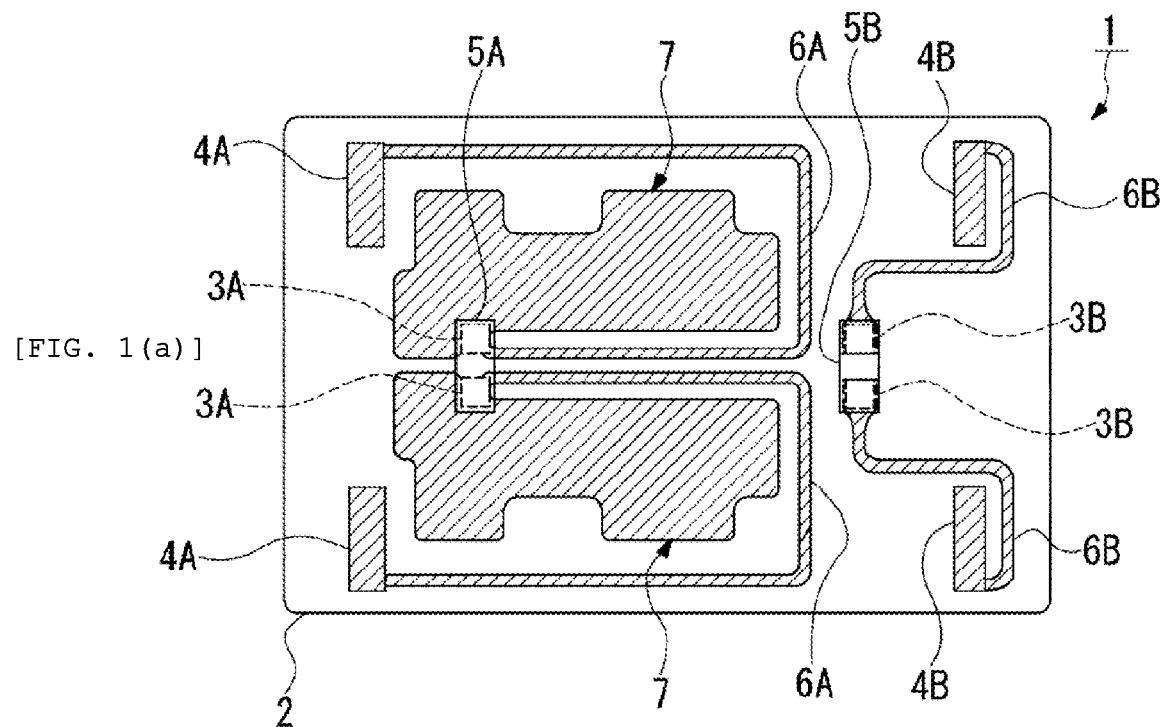
[FIG. 1(a)]
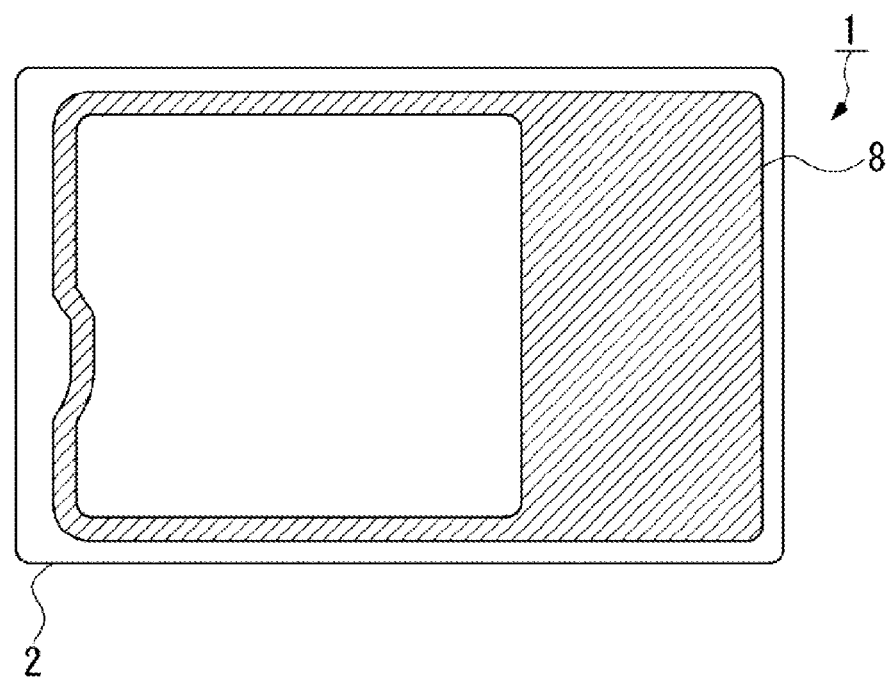
[FIG. 1(b)]

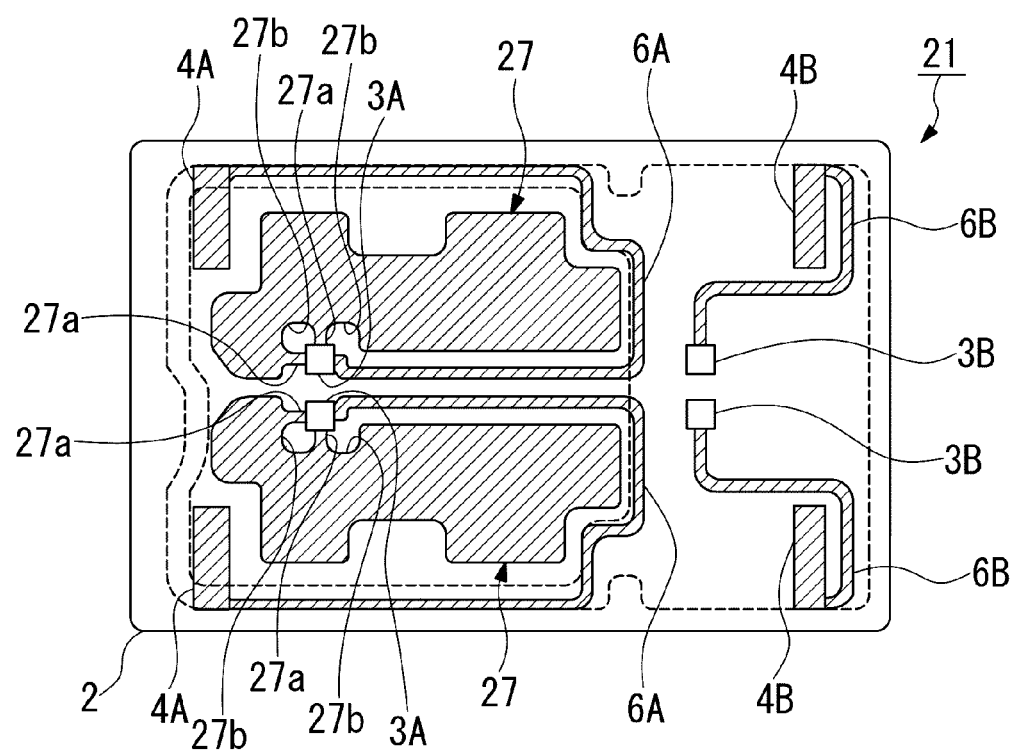
[FIG. 2]

[FIG.3]
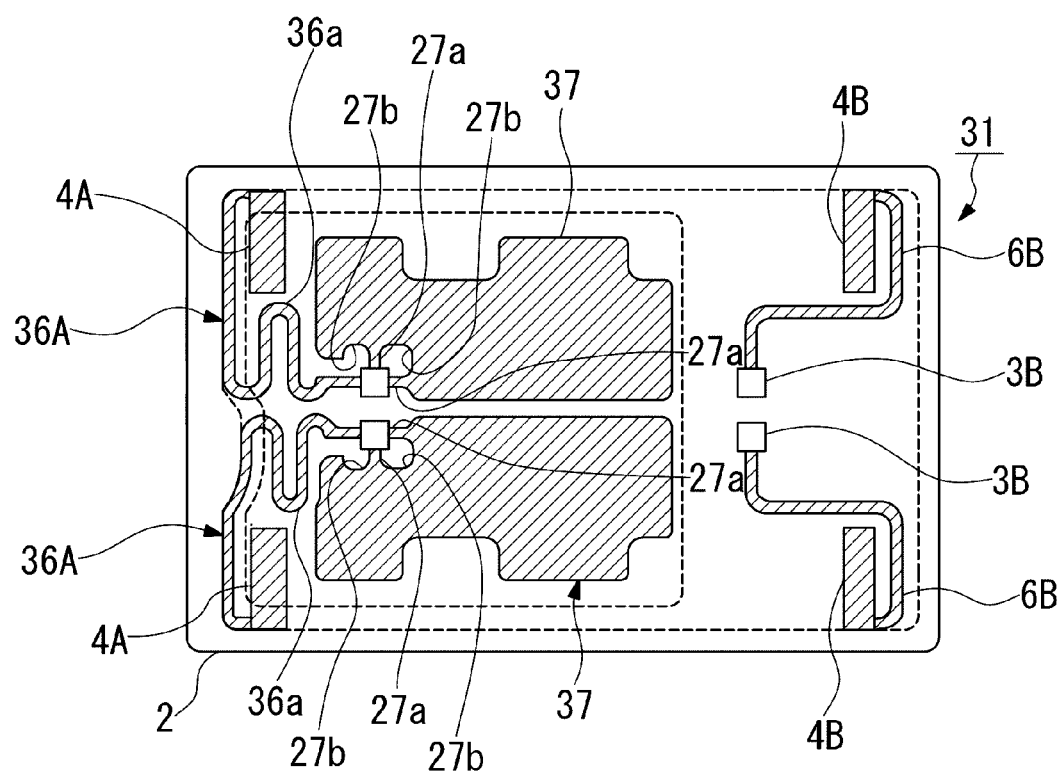

INFRARED SENSOR

CROSS REFERENCE TO RELATED APPLICATIONS

This application is related to application: "INFRARED SENSOR" filed on Jul. 24, 2018 as U.S. Ser. No. 16/072,282 in the names of Kenji NAKAMURA; Kazuyoshi TARI and Shingo HIRANO as a national phase entry of PCT/JP2017/002914, which application is assigned to the assignee of the present application and is incorporated by reference herein.

BACKGROUND OF THE INVENTION

Field of the Invention

The present invention relates to an infrared sensor having an excellent responsivity that is suitable for measuring a temperature of a heat roller used in a copying machine, printer, or the like.

Description of the Related Art

In general, in order to measure a temperature of an object to be measured such as a fuser roller used in an image-forming apparatus such as a copying machine, printer, or the like, there is an infrared sensor installed opposing to the object to be measured so as to measure the temperature by receiving radiant heat from the object.

In recent years, a film-type infrared sensor has been developed as one of such infrared sensors, in which a thin film thermistor is formed on an insulating film so that the sensor can have an excellent flexibility and a thin profile as a whole.

For example, Patent document 1 discloses an infrared sensor that includes an insulating film; first and second heat sensitive elements that are provided so as to be spaced apart from each other on either surface of the insulating film; first and second conductive wiring films that are formed on either surface of the insulating film and connected to first and second heat sensitive elements respectively; and an infrared reflection film that is provided on the other surface of the insulating film so as to oppose to the second heat sensitive element. In this infrared sensor, the heat collection from a part of the insulating film that absorbs infrared radiation has been improved by increasing the area of the wiring film formed on the side for receiving infrared radiation.

PRIOR ART DOCUMENT

Patent Document

[Patent Document 1] Japanese Unexamined Patent Application Publication No. 2013-160635

SUMMARY OF THE INVENTION

Problems to be Solved by the Invention

The following problems still remain in the conventional technologies described above.

In order to improve the sensibility and response speed of a sensor, heat from an insulating film that receives infrared radiation must be efficiently transferred to a heat sensitive element so as to accelerate the temperature change of the heat sensitive element. However, in the technology described in Patent document 1, although the heat collection has been improved by providing the wiring film having a larger area formed on the side for receiving infrared radiation, heat can also be transferred from the wiring film to a terminal electrode. Therefore, a sensor structure that allows heat to be further efficiently transferred to the heat sensitive element has been demanded.

The present invention has been made in view of the aforementioned circumstances, and an object of the present invention is to provide an infrared sensor that allows heat to be efficiently transferred from an insulating film to a heat sensitive element and has a good responsivity.

Means for Solving the Problems

The present invention adopts the following configuration in order to overcome the aforementioned problems. Specifically, an infrared sensor according to a first aspect of the present invention comprises: an insulating film; a pair of adhesive electrodes that is patterned on either surface of the insulating film; a pair of terminal electrodes that is patterned on either surface of the insulating film; a heat sensitive element that is provided on either surface of the insulating film and is connected to the pair of adhesive electrodes; a pair of pattern wiring parts that is patterned on either surface of the insulating film with one end thereof being connected to the pair of adhesive electrodes and the other end thereof being connected to the pair of terminal electrodes; and a heat transfer film that is connected to the adhesive electrode besides the pattern wiring part and is patterned in the vicinity of the adhesive electrode on either surface of the insulating film using a thin film having a higher thermal conductivity than that of the insulating film.

Since the infrared sensor according to the first aspect of the present invention comprises the heat transfer film that is connected to the adhesive electrode besides the pattern wiring part and is patterned in the vicinity of the adhesive electrode on either surface of the insulating film using a thin film having a higher thermal conductivity than that of the insulating film, the heat absorbed in the insulating film can be difficult to be transferred to the side of the terminal electrode while it can be preferentially transferred to the heat sensitive element through the heat transfer film. Specifically, by controlling the direction of the flow of heat resulting from the infrared radiation that is received by the insulating film to the adhesive electrode through the heat transfer film, most of the received infrared energy can be efficiently utilized for increasing or decreasing the temperature of the heat sensitive element.

An infrared sensor according to a second aspect of the present invention is characterized by the infrared sensor according to the first aspect of the present invention, wherein the heat transfer film is formed so as to have a larger area than that of the pattern wiring part.

Specifically, in this infrared sensor, since the heat transfer film is formed so as to have a larger area than that of the pattern wiring part, the heat transfer film can receive more heat from the insulating film than the pattern wiring part, which allows more heat to be transferred to the heat sensitive element.

An infrared sensor according to a third aspect of the present invention is characterized by the infrared sensor according to the first or second aspect, wherein the pattern wiring part extends from the adhesive electrode towards the side opposite to the terminal electrode and further extends along a part of the outer periphery of the heat transfer film so as to reach the terminal electrode.

Specifically, in this infrared sensor, since the pattern wiring part extends from the adhesive electrode towards the side opposite to the terminal electrode and further extends along a part of the outer periphery of the heat transfer film so as to reach the terminal electrode, the pattern wiring part extends for a long distance so as to increase the thermal resistance and also extends once towards the side opposite to the terminal electrode so as to allow further suppression of the heat flow to the terminal electrode.

An infrared sensor according to a fourth aspect of the present invention is characterized by the infrared sensor according to any one of the first to third aspects, wherein the connection width of the heat transfer film to the adhesive electrode is set to be wilder than that of the pattern wiring part to the adhesive electrode.

Specifically, in this infrared sensor, the connection width of the heat transfer film to the adhesive electrode is set to be wilder than that of the pattern wiring part to the adhesive electrode, heat can be efficiently transferred from the heat transfer film to the adhesive electrode while it can be difficult to be transferred from the adhesive electrode to the pattern wiring part.

An infrared sensor according to a fifth aspect of the present invention is characterized by the infrared sensor according to any one of the first to fourth aspects, wherein the pattern wiring part has a tortuous portion formed by several folding.

Specifically, in this infrared sensor, since the pattern wiring part has the tortuous portion formed by several folding, the thermal resistance to the terminal electrode can be increased.

Effects of the Invention

According to the present invention, the following effects may be provided.

Specifically, since the infrared sensor of the present invention comprises the heat transfer film that is connected to the adhesive electrode besides the pattern wiring part and is patterned in the vicinity of the adhesive electrode on either surface of the insulating film using a thin film having a higher thermal conductivity than that of the insulating film, the heat absorbed in the insulating film can be difficult to be transferred to the side of the terminal electrode while it can be preferentially transferred to the heat sensitive element through the heat transfer film.

Therefore, in the infrared sensor of the present invention, since the heat resulting from the received infrared radiation is positively guided to the heat sensitive element through the heat transfer film so as to reduce the thermal resistance, more heat can be transferred to the heat sensitive element. Therefore the present sensor has a high responsivity and is suitable for measuring a temperature of a heat roller used in a copying machine, printer, or the like.

BRIEF DESCRIPTION OF THE DRAWINGS

FIG. 1(a) shows a plan view and FIG. 1(b) shows a back side view illustrating an infrared sensor according to a first embodiment of the present invention.

FIG. 2 is a plan view illustrating an infrared sensor according to a second embodiment of the present invention with a heat sensitive element being removed.

FIG. 3 is a plan view illustrating an infrared sensor according to a third embodiment of the present invention with a heat sensitive element being removed.

DESCRIPTION OF THE EMBODIMENTS

Hereinafter, an infrared sensor according to a first embodiment of the present invention will be described with reference to FIG. 1(a) and FIG. 1(b).

As shown in FIG. 1(a) and FIG. 1(b), an infrared sensor 1 according to the present embodiment includes an insulating film 2, a pair of first adhesive electrodes 3A that is patterned on either surface(face) of the insulating film 2, a pair of first terminal electrodes 4A that is patterned on either surface of the insulating film 2, a first heat sensitive element 5A that is provided on either surface of the insulating film 2 and is connected to the pair of first adhesive electrodes 3A, a pair of first pattern wiring parts 6A that is patterned on either surface of the insulating film 2 with one end thereof being connected to the pair of first adhesive electrodes 3A and the other end thereof being connected to the pair of first terminal electrodes 4A; and a pair of heat transfer films 7 that is connected to the pair of first adhesive electrodes 3A besides the first pattern wiring parts 6A and is patterned in the vicinity of the adhesive electrodes 3A on either surface of the insulating film 2 using a thin film having a higher thermal conductivity than that of the insulating film 2.

The first pattern wiring part 6A and the heat transfer film 7 are not in a direct contact with each other, but are indirectly connected to each other through the first adhesive electrode 3A.

The infrared sensor 1 according to the present embodiment also includes a pair of second adhesive electrodes 3B that is patterned on either surface of the insulating film 2; a pair of second terminal electrodes 4B that is patterned on either surface of the insulating film 2; a second heat sensitive element 5B that is provided on either surface of the insulating film 2, is connected to the pair of second adhesive electrodes 3B, and is arranged spaced apart from the first heat sensitive element 5A; and a pair of second pattern wiring parts 6B that is patterned on either surface of the insulating film 2 with one end thereof being connected to the pair of second adhesive electrodes 3B and the other end thereof being connected to the pair of second terminal electrodes 4B.

The heat transfer film 7 is formed so as to have a larger area than that of the first pattern wiring part 6A.

The pair of first pattern wiring parts 6A extends from the pair of first adhesive electrodes 3A towards the side opposite to the pair of first terminal electrodes 4A and further extends along a part of the outer periphery of the pair of heat transfer films 7 so as to reach their respective first terminal electrodes 4A. Specifically, the first pattern wiring parts 6A first extend from the first adhesive electrodes 3A between the pair of heat transfer films 7 towards the second heat sensitive element 5B, and then extend in the direction along the short side of the insulating film 2 towards the long side thereof in the vicinity of the end of the pair of heat transfer films 7, and further extend outside the heat transfer films 7 along the long side of the insulating film 2 to the first terminal electrodes 4A.

In addition, the second pattern wiring part 6B extends for a shorter distance than the first pattern wiring part 6A so as to reach the second terminal electrode 4B.

The connection width of the heat transfer film 7 to the first adhesive electrode 3A is set to be wilder than that of the first pattern wiring part 6A to the first adhesive electrode 3A. Specifically, the heat transfer film 7 is connected to entirely two of the four sides of the first adhesive electrode 3A having a square shape, whereas the first pattern wiring part 6A is connected to one of the four corners of the first adhesive electrode 3A. Thus, the connecting part of the heat transfer film 7 to the first adhesive electrode 3A is set separately from the connecting part of the first pattern wiring part 6A to the first adhesive electrode 3A.

To the first adhesive electrode 3A and a second adhesive electrode 3B are adhered their respective terminal electrodes of the first heat sensitive element 5A and the second heat sensitive element 5B with a conductive adhesive such as a solder.

In the present embodiment, on the other surface of the insulating film 2 (surface on the side for receiving infrared radiation, back surface), as shown in FIG. 1(b), an infrared reflection film 8 is formed so as to cover the portion immediately above the second heat sensitive element 5B. This infrared reflection film 8 is formed so as to avoid the portion immediately above the pair of heat transfer films 7.

Specifically, in the present embodiment, the first heat sensitive element 5A that is arranged immediately under the surface for receiving infrared radiation is an element for detecting infrared radiation, and the second heat sensitive element 5B that is arranged immediately under the infrared reflection film 8 is an element for compensation.

Note that each of the terminal electrodes, each of the pattern wiring parts, the heat transfer films 7, and the infrared reflection film 8 are indicated by hatching in FIG. 1(a) and FIG. 1(b).

The insulating film 2 is made of a polyimide resin sheet having a generally rectangular shape, while the infrared reflection film 8, each of the pattern wiring parts, each of the terminal electrodes, each of the adhesive electrodes, and the heat transfer films 7 are made of a copper foil. Specifically, these elements compose a double-sided flexible substrate in which the infrared reflection film 8, each of the pattern wiring parts, each of the terminal electrodes, each of the adhesive electrodes, and the heat transfer films 7 made of copper foil are patterned on both surfaces of the insulating film 2 as a polyimide substrate.

The pair of first terminal electrodes 4A and the pair of second terminal electrodes 4B are arranged in the vicinity of the corners of the insulating film 2.

The infrared reflection film 8 is composed of the copper foil as described above and a gold plating film that is laminated on the copper foil.

This infrared reflection film 8 is made of a material having a higher infrared reflectance than that of the insulating film 2 and is formed by coating a copper foil with a gold plating film as described above. This film may be made of, for example, a mirror finished aluminum vapor-deposited film, aluminum foil, or the like other than the gold plating film.

The first heat sensitive element 5A and the second heat sensitive element 5B are chip thermistors at both ends of which terminal electrodes (not shown) are formed. Such thermistors include NTC-type, PTC-type, CTR-type thermistors, and the like, but in the present embodiment, a NTC-type thermistor is employed for the first heat sensitive element 5A and the second heat sensitive element 5B, for example. This thermistor is made of a Mn—Co—Cu or Mn—Co—Fe based thermistor material, or the like.

As described above, since the infrared sensor 1 of the present embodiment includes the heat transfer film 7 that are connected to the first adhesive electrode 3A besides the first pattern wiring part 6A and are patterned on either surface of the insulating film 2 in the vicinity of the first adhesive electrode 3A using a thin film having a higher thermal conductivity than that of the insulating film 2, the heat absorbed in the insulating film 2 can be difficult to be transferred to the side of the first terminal electrode 4A while it can be preferentially transferred to the first heat sensitive element 5A through the heat transfer film 7. Specifically, by controlling the direction of the flow of heat resulting from the infrared radiation that is received by the insulating film 2 into the first adhesive electrode 3A through the heat transfer film 7, most of the received infrared energy can be efficiently utilized for increasing or decreasing the temperature of the first heat sensitive element 5A.

In addition, since the heat transfer film 7 is formed so as to have a larger area than that of the first pattern wiring part 6A, the heat transfer film 7 can receive more heat from the insulating film 2 than the first pattern wiring part 6A, which allows more heat to be transferred to the first heat sensitive element 5A.

Also, since the first pattern wiring part 6A extends from the first adhesive electrode 3A towards the side opposite to the first terminal electrode 4A and further extends along a part of the outer periphery of the heat transfer film 7 so as to reach the first terminal electrode 4A, the first pattern wiring part 6A extends for a long distance so as to increase the thermal resistance and also extends once towards the side opposite to the first terminal electrode 4A so as to allow further suppression of the heat flow to the first terminal electrode 4A.

Furthermore, since the connection width of the heat transfer film 7 to the first adhesive electrode 3A is set to be wilder than that of the first pattern wiring part 6A to the first adhesive electrode 3A, heat can be efficiently transferred from the heat transfer film 7 to the first adhesive electrode 3A while it can be difficult to be transferred from the first adhesive electrode 3A to the first pattern wiring part 6A.

Next, infrared sensors according to a second and third embodiments of the present invention will be described below with reference to FIGS. 2 and 3. Note that, in the following description of each embodiment, the same components as those in the first embodiment described above are denoted by the same reference numerals, and thus the description thereof is omitted. In FIGS. 2 and 3, the infrared reflection film 8 formed on the other surface of the insulating film 2 is indicated with a dashed line.

The second embodiment is different from the first embodiment in the following points. In the first embodiment, the heat transfer film 7 is connected without any gap to entirely two of the four sides of the first adhesive electrode 3A having a square shape, whereas in the infrared sensor 21 according to the second embodiment, as shown in FIG. 2, the heat transfer film 27 is connected to partially two of the four sides of the first adhesive electrode 3A having a square shape through a constricted portion 27a.

Specifically, in the second embodiment, a concave portion 27b is formed at the connecting part of the heat transfer film 27 to the two sides adjacent to each other of the first adhesive electrode 3A so as to define the constricted portion 27a that is a narrower portion of the connecting part.

As described above, in second embodiment, since the constricted portion 27a is formed at the connecting part of the heat transfer film 27 to the first adhesive electrode 3A and the constricted portion 27a can function as a thermal land, heat does not escape to the surrounding area beyond necessity during soldering, and as a result, poor soldering resulting from undissolved solder can be suppressed. Even in this case, since the first pattern wiring part 6A that is thin is connected to only one side of the first adhesive electrode 3A, heat from the first adhesive electrode 3A can be difficult to be transferred to the first pattern wiring part 6A.

In addition, in the second embodiment, the end of the heat transfer film 27 on the side of the first terminal electrode 4A is formed so as to have a larger size than in the first embodiment. Specifically, since the end of the heat transfer film 27 is formed so as to extend to the portion between the pair of first terminal electrodes 4A, the heat collection of the heat transfer film 27 can be improved.

Next, the difference of a third embodiment from the second embodiment will be described below. In the second embodiment, the first pattern wiring parts 6A extend from the first adhesive electrodes 3A towards the side of the second heat sensitive element 5B and further extend outside the heat transfer films 27 so as to reach the first terminal electrodes 4A, whereas in the infrared sensor 31 of the third embodiment, as shown in FIG. 3, a pair of first pattern wiring parts 36A extends from the pair of first adhesive electrodes 3A to the direction opposite to that in the first embodiment and then passes through tortuous portions 36a formed by several folding so as to reach their respective first terminal electrodes 4A.

Specifically, in the third embodiment, since the first pattern wiring part 36A has the tortuous portion 36a, the thermal resistance to the first terminal electrode 4A can be increased. Therefore, the first pattern wiring part 6A can extend for a long distance without extending once towards the side of the second heat sensitive element 5B and taking a bypass route outside the heat transfer film 37 as in the second embodiment, which can suppress the heat transfer to the first terminal electrode 4A.

The technical scope of the present invention is not limited to the aforementioned embodiments, but the present invention may be modified in various ways without departing from the scope or teaching of the present invention.

For example, in each embodiment described above, although the first heat sensitive element is configured to detect the heat transferred from the insulating film that directly receives infrared radiation, an infrared absorbing film having a higher infrared absorbency than that of the insulating film may be formed immediately above the first heat sensitive element and on either surface of the insulating film. In this case, the infrared absorbing effect can be further improved in the first heat sensitive element, and thus a favorable temperature difference between the first heat sensitive element and the second heat sensitive element can be obtained. Specifically, this infrared absorbing film may be configured to absorb infrared radiation radiated from an object to be measured, and then the heat from the infrared absorbing film, which absorbs infrared radiation and generates heat, is transferred through the insulating film so as to allow the temperature of the first heat sensitive element immediately below the film to be changed.

REFERENCE NUMERALS 1, 21, 31: infrared sensor, 2: insulating film, 3A: first adhesive electrode, 3B: second adhesive electrode, 4A: first terminal electrode, 4B: second terminal electrode, 5A: first heat sensitive element, 5B: second heat sensitive element, 6A, 36A: first pattern wiring part, 6B: second pattern wiring part, 7, 27, 37: heat transfer film, 36a: tortuous portion of first pattern wiring part

What is claimed is:

1. An infrared sensor comprising:
   an insulating film;
   a pair of adhesive electrodes that is patterned on one surface of the insulating film;
   a pair of terminal electrodes that is patterned on said one surface of the insulating film;
   a heat sensitive element that is provided on said one surface of the insulating film and is connected to the pair of adhesive electrodes;
   a pair of pattern wiring parts that is patterned on said one surface of the insulating film with one end thereof being connected to the pair of adhesive electrodes and the other end thereof being connected to the pair of terminal electrodes; and
   a heat transfer film that is, connected to the adhesive electrode besides the pattern wiring part and is patterned in the vicinity of the adhesive electrode on said one surface of the insulating film using a thin film having a higher thermal conductivity than that of the insulating film.

2. The infrared sensor according to claim 1, wherein the heat transfer film is formed so as to have a larger area than that of the pattern wiring part.

3. The infrared sensor according to claim 1, wherein the pattern wiring part extends from the adhesive electrode towards the side opposite to the terminal electrode, and further extends along a part of the outer periphery of the heat transfer film so as to reach the terminal electrode.

4. The infrared sensor according to claim 1, wherein the connection width of the heat transfer film to the adhesive electrode is set to be wilder than that of the pattern wiring part to the adhesive electrode.

5. The infrared sensor according to claim 1, wherein the pattern wiring part has a tortuous portion formed by several folding.

* * * * *